(Model.)
L. N. WESTOVER.
UNIVERSAL SHAFT COUPLING.
No. 430,597. Patented June 17, 1890.
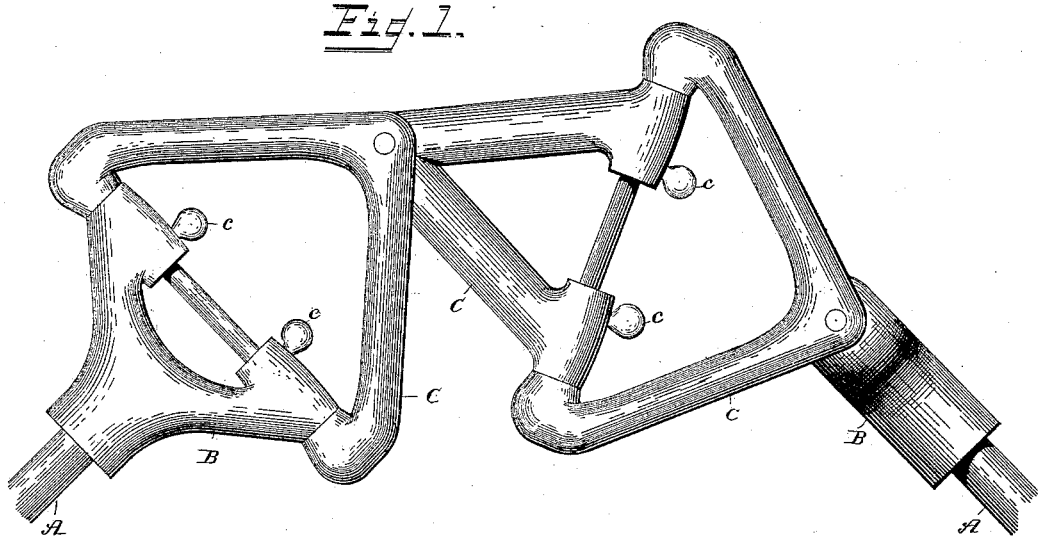
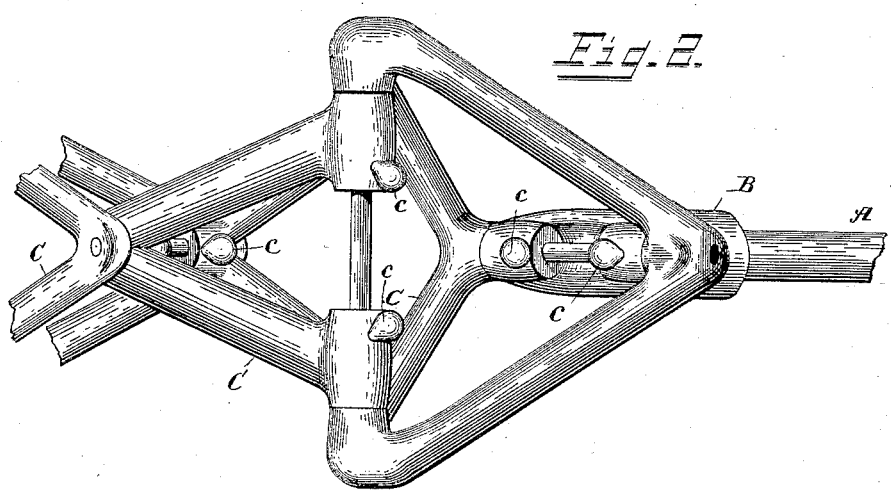
Witnesses
Edwin L. Bradford
Geo. M. Copenhaver
Inventor
Louis N. Westover
By his Attorneys
T. D. Stockbridge & Son

UNITED STATES PATENT OFFICE.

LOUIS N. WESTOVER, OF MANCHESTER, NEW HAMPSHIRE.

UNIVERSAL SHAFT-COUPLING.

SPECIFICATION forming part of Letters Patent No. 430,597, dated June 17, 1890.

Application filed September 6, 1889. Serial No. 323,125. (Model.)

*To all whom it may concern:*

Be it known that I, LOUIS N. WESTOVER, a citizen of the United States, residing at Manchester, Hillsborough county, New Hampshire, have invented certain new and useful Improvements in Universal Shaft-Couplings; and I do hereby declare the following to be a full, clear, and exact description of the invention, such as will enable others skilled in the art to which it appertains to make and use the same.

My invention relates to universal shaft-couplings, whereby two or more shafts or shaft-sections may be set and driven at any desired angle with each other.

In all universal shaft-couplings known to me, except the ordinary bevel-gear, when the shafts are at any great variation from a straight line, the coupling binds during a part of its revolution, causing great wear, loss of power transmitted, and a rattling noise, and is moreover liable to get out of order. Furthermore, most of these couplings produce an unsteady, accelerated, and retarded motion of the shaft driven through the coupling.

The object of my invention is to overcome the defects incident to universal couplings hitherto used and to produce a durable, noiseless, and efficient coupling for heavy work, and which will give uniformity of speed to all the sections coupled together thereby, and will give substantially the same power throughout all the sections.

To these ends my invention consists, generally, in the combination, with two or more shafts, of a series of tetrahedral parts or links of greater dimensions than the diameter of the shaft, flexibly connected together by pivots at right angles with and in planes in advance of each other.

In the drawings, Figure 1 is a plan showing my invention. Fig. 2 is a perspective of several of the parts or links.

A A are shaft-sections, supported in suitable bearings or hangers, and B B are adjustable head-pieces for connection with the ends of the shaft-sections. Any cross-head attached to the shafts will answer the purpose; but for convenience in applying the coupling to the shafts I provide these heads and attach them to the links as a part of the coupling.

C C C are tetrahedral blocks or links pivoted together and to the head-pieces through the vertex of angles of the triangular sides, as shown, thus bringing the pivots at right angles with the shaft and in succession at right angles with each other. These parts are made, by preference, in skeleton or link form, as shown, but it is obvious that they may be regular solids or solids with exterior cutaway, the essential characteristic being that the pivot-bearings be in planes progressively in advance of and at right angles with each other, and that each of said bearings be extended a distance greater than the diameter of the main shaft. By arranging the pivots at right angles with each other and in progressively advancing planes the binding and loss of power due to the ordinary universal joint is avoided, and the extension or enlargement of the parts considerably beyond the diameter of the shaft gives strength to the coupling equal to that of the shaft itself. At least three links or blocks and four pivots or joints are required for my coupling; but it is obvious that a larger number may be used without departing from my invention.

I have shown oil cups or cells *c c* to illustrate a convenient way of lubricating the joint. The operation of these being obvious no description thereof is deemed necessary.

Having described my invention, I claim—

1. A universal shaft-coupling consisting of the combination of three or more tetrahedral parts or links flexibly connected together by pivots at right angles with each other, substantially as described.

2. A universal shaft-coupling consisting of the combination of heads fitted for connecting with shaft-sections, and a plurality of tetrahedral parts or links of greater lateral dimensions than the diameter of the shaft pivoted together at right angles with and in planes in advance of each other.

3. A universal shaft-coupling consisting of the combination of a series of tetrahedral parts flexibly connected together by pivots in planes in advance of each other.

In testimony whereof I affix my signature in presence of two witnesses.

LOUIS N. WESTOVER.

Witnesses:
 LUCETTA W. STOCKBRIDGE,
 F. J. EVANS.